United States Patent Office 2,927,913
Patented Mar. 8, 1960

2,927,913

PRODUCTION OF UNIFORM GELS OF WATER-INSOLUBLE POLYMERIC N-VINYL-LACTAMS

Frederick Grosser, North Plainfield, N.J., assignor to General Aniline & Film Corporation, New York, N.Y., a corporation of Delaware No Drawing. Application September 30, 1954
Serial No. 459,545

5 Claims. (Cl. 260—88.3)

This invention relates to a novel method for producing polymeric N-vinyl-lactams which are insoluble in water and common organic solvents.

N-vinyl-lactams and, particularly, N-vinyl-α-pyrrolidone, may be conveniently polymerized in aqueous solution by using hydrogen peroxide or other inorganic and organic peroxidic polymerization catalysts, such as sodium and potassium persulfate or peroxide, benzoyl peroxide, etc., together with a small amount of ammonium hydroxide, or an amine, as an activator. The peroxidic polymerization of N-vinyl-lactams is disclosed in U.S. Patent 2,335,454, of November 30, 1943, to Schuster et al. Temperatures during the polymerization from 25 to 100° C. have been employed, and a temperature range of 40 to 60° C. has been preferred for the polymerization. Under these conditions, using monomer of average purity, i.e., monomer obtained by one distillation, of crude vinyl-pyrrolidone in a 5-plate vacuum still at about 80 percent reflux, polymers ranging in K value, as defined by H. Fikentscher in "Cellulose-Chemie," XIII, 58, 1932, in the range of 10 to 50 have been obtained. The K value of the resulting polymer varies inversely as the concentration of catalyst when the other conditions of polymerization remain the same. The thus obtained polymers are readily soluble in water, and in many organic solvents, such as alcohols, ketones, chlorinated hydrocarbons, lactones, tetrahydrofuran and pyridine.

While the ready solubility of the thus obtained polymers is a substantial advantage in many applications, there still remain a number of applications where the solubility of polymers is a disadvantage. Thus, polyvinyl pyrrolidone is known to exhibit markedly strong adhesion to glass. However, its use as an adhesive has been limited because of its ready solubility in water and many organic solvents. Likewise, polyvinyl pyrrolidone has been found to be of value as a coating for textiles and similar materials in that it increases the dyeability of certain synthetic fibres, and can impart a desirable finish to textiles. However, due to the solubility of polvinyl pyrrolidone heretofore available, this effect has been fugitive and full use thereof could not be made.

I have now discovered that, under proper conditions, and with the use of certain cross-linking agents, it is possible to cause N-vinyl-lactams to polymerize in aqueous solution, so as to form a polymer which is insoluble in water and in all common classes of organic solvents. The polymer thus formed is uniformly distributed through the aqueous medium as a colloidal dispersion or gel, varying in consistency from a soft jelly-like mass (similar in consistency and appearance to gels obtained from gelatin) to a stiff, rubber-like body, the properties of the gel depending on the concentration and degree of polymerization of the polymer and cross-linking thereof, which, in turn, depend to a large extent on the concentration of the peroxidic catalyst and cross-linking agent, respectively. These gels are clear, transparent masses, varying in color from colorless to yellow. If the water therein is not allowed to evaporate, the gels retain their uniform composition, unchanged indefinitely. Removal of the water, however, leaves a hard, glassy, insoluble polymer.

Since N-vinyl-α-pyrrolidone is commercially available, and is the most widely used of the polymeric N-vinyl-lactams, the present invention will be described with particular reference to the polymerization of N-vinyl-α-pyrrolidone. However, it is to be understood that the invention is applicable to the polymerization of N-vinyl-lactams as a class, including, in addition to N-vinyl-α-pyrrolidone, N-vinyl-α-piperidone, N-vinyl-hexahydro-phthalimidine and N-vinyl-caprolactam.

Insoluble polymeric N-vinyl-α-pyrrolidone is made, according to my invention, by adding a small amount of a metal salt to an aqueous solution of vinylpyrrolidone prior to the addition of catalyst and activator. After the subsequent addition of hydrogen peroxide and ammonia, the solution is allowed to stand at room temperature until polymerization is complete (18–72 hours). A clear, homogeneous gel is formed, which retains its shape, and composition even if immersed in a large excess of water. Mechanical subdivision of the gel, followed by mechanical agitation in water, results in some swelling of the gel particles, but solution does not occur.

The water soluble salts of metals of group VIII, series 4, of the periodic tables; i.e., ferric salts, nickel salts and cobalt salts, have been found to be particularly valuable as cross-linking agents for use in practicing the present invention. However, if desired, the salts of chromium and manganese may be used in place of, or in conjunction with, ferric, nickel or cobalt salts.

The details of the present invention will be apparent to those skilled in the art from consideration of the following specific examples. In these examples, the N-vinyl-α-pyrrolidone employed was the monomer of average purity obtained by one distillation of crude vinyl-pyrrolidone in a 5-plate vacuum still at about 80 percent reflux:

*Example 1 (2165-265-2)*

In a 125-cc., wide-mouth, screw-cap bottle was placed 50 cc. vinylpyrrolidone
50 cc. distilled water
1.0 cc. aqueous ferric chloride solution (1%)

To this solution was added 1.0 cc. ammonium hydroxide (26%)
1.5 cc. hydrogen peroxide (35%)

The solution was agitated thoroughly and then allowed to stand, without agitation, in the loosely capped bottle at room temperature for 48 hours. Polymerization occurred after about 30 hours to form a clear, transparent, nearly colorless gel. This gel was of a rubber-like consistency, and returned to its original shape after deformation.

In an identical polymerization, but omitting the addition of ferric chloride, polymerization occurred in less than 24 hours to form a normal 50 percent solution of soluble polyvinylpyrrolidone.

*Example 2 (2165-266-14)*

Polymerization was effected as in Example 1 with a solution of 30 cc. vinylpyrrolidone
70 cc. distilled water
1 cc. aqueous ferric chloride solution (1%)
0.6 cc. ammonium hydroxide (26%)
0.9 cc. hydrogen peroxide (35%)

In this case about 70 hours were required to produce a clear, colorless, transparent gel which was rubber-like, but of somewhat softer consistency than that produced in Example 1.

*Example 3 (2165-266-10)*

Polymerization was effected as in Example 1 with a solution of 80 cc. vinylpyrrolidone
20 cc. distilled water
8 cc. aqueous ferric chloride solution (0.1%)
1.6 cc. ammonium hydroxide (26%)
2.4 cc. hydrogen peroxide (35%)

In this case, a yellow, transparent rubber-like gel was formed which had about the consistency of an ordinary laboratory rubber stopper.

*Example 4 (2165-273-7)*

Polymerization was effected as in Example 1 with a solution of 50 cc. vinylpyrrolidone
50 cc. distilled water
1 cc. aqueous nickel chloride solution (1%)
1 cc. ammonium hydroxide (25%)
1.5 cc. hydrogen peroxide (35%)

A transparent, colorless, rubber-like gel was formed, similar in consistency to the gel obtained in Example 1.

It is to be understood that the foregoing examples are illustrative only of the present invention, and various modifications may be made therein by those skilled in the art without departing from the spirit of the invention. As indicated by the examples, the consistency of the gel which is obtained with polymerization can be varied not only by the concentrations of the N-vinylpyrrolidone, but also by the concentration of the amount of the metal salt which is used; increasing the amount of the metal salt favors the production of a stiffer, presumably more highly cross-linked, gel. Critical limits and the amount of metal salt to be used has not been established. Only relatively small amounts, based on the amount of monomer need be used. Using ferric chloride as the salt, insoluble gels have been obtained when from 0.01 to 0.033 percent thereof, based on the weight of the monomer have been used. With other salts, the amount may vary somewhat, but it is still on the same general order.

While preferred amounts of hydrogen peroxide and ammonium hydroxide have been used in the foregoing examples, it will be understood that the amount used may be varied somewhat. As is common in peroxidic polymerizations, the highest polymers are obtained when a minimum amount of peroxide catalyst, necessary to effect polymerization, is employed. This amount varies with the particular peroxidic catalysts used, and with particular batches of monomer; but operative amounts can only be determined by simple preliminary experiment. The amount of ammonium hydroxide to be used is preferably less than the amount of peroxidic catalyst, and the preferred amount is about 60 percent of the peroxidic catalyst. In place of ammonium hydroxide, amines, such as monoethylamine, triethylamine, tetramethylammonium hydroxide, ethanolamine, pyridine, may be used, if desired.

It appears that the initial temperature of the polymerization is fairly critical in practicing the present invention. It is preferred to effect the polymerization at room temperature; and, in any event, not above 30° C. It has been found that heating of the solution to be polymerized, which contains metal salt of the type specified, as is common in the prior art polymerization of N-vinyl-pyrrolidone, results in a soluble polymer being obtained. Thus, when a solution similar to that used in Example 1 was heated to 50° C., polymerization was complete in less than two hours, with the formation of a soluble polymer.

I claim:

1. In the method of polymerizing N-vinyl-α-pyrrolidone wherein an aqueous solution of N-vinyl-α-pyrrolidone is treated with a small amount of a water-soluble peroxide polymerization catalyst and in the presence of a minor amount of an activator selected from the group consisting of ammonium hydroxide and amines, the improvement whereby a uniform gel of water-insoluble polymeric N-vinyl-α-pyrrolidone is obtained, which comprises incorporating a small amount of a water-soluble salt of a metal selected from the group consisting of chromium, manganese, iron, nickel and cobalt in an aqueous solution of monomeric N-vinyl-α-pyrrolidone, and thereafter adding to the thus obtained solution of N-vinyl-α-pyrrolidone containing water-soluble metal salt, a small amount of a water-soluble peroxide polymerization catalyst and a minor amount of an activator selected from the group consisting of ammonium hydroxides and amines while maintaining the temperature of the reaction mixture in the range of 20–30° C. whereby said N-vinyl-α-pyrrolidone is polymerized to a uniform gel of water-insoluble polymeric N-vinyl-α-pyrrolidone.

2. The method as defined in claim 1, wherein the peroxide polymerization catalyst specified is hydrogen peroxide.

3. The process as defined in claim 2, wherein the activator specified is ammonium hydroxide.

4. The process as defined in claim 3, wherein the metal salt specified is ferric chloride, and it is present in the range of 0.01 to 0.033% based on the weight of the monomer.

5. The process as defined in claim 3, wherein the metal salt specified is nickel chloride.

References Cited in the file of this patent

UNITED STATES PATENTS

| | | |
|---|---|---|
| 2,335,454 | Schuster et al. | Nov. 30, 1943 |
| 2,589,258 | Howard | Mar. 18, 1952 |
| 2,634,259 | Ney et al. | Apr. 7, 1953 |
| 2,642,410 | Hoppens | June 16, 1953 |
| 2,684,954 | Miller | July 27, 1954 |

OTHER REFERENCES

Modern Plastics, published November 1945, pages 157–158. (Copy in Scientific Library.)